Sept. 6, 1927.
G. KOMAREK
DRIER
Filed Feb. 12, 1924
1,641,337
10 Sheets-Sheet 2
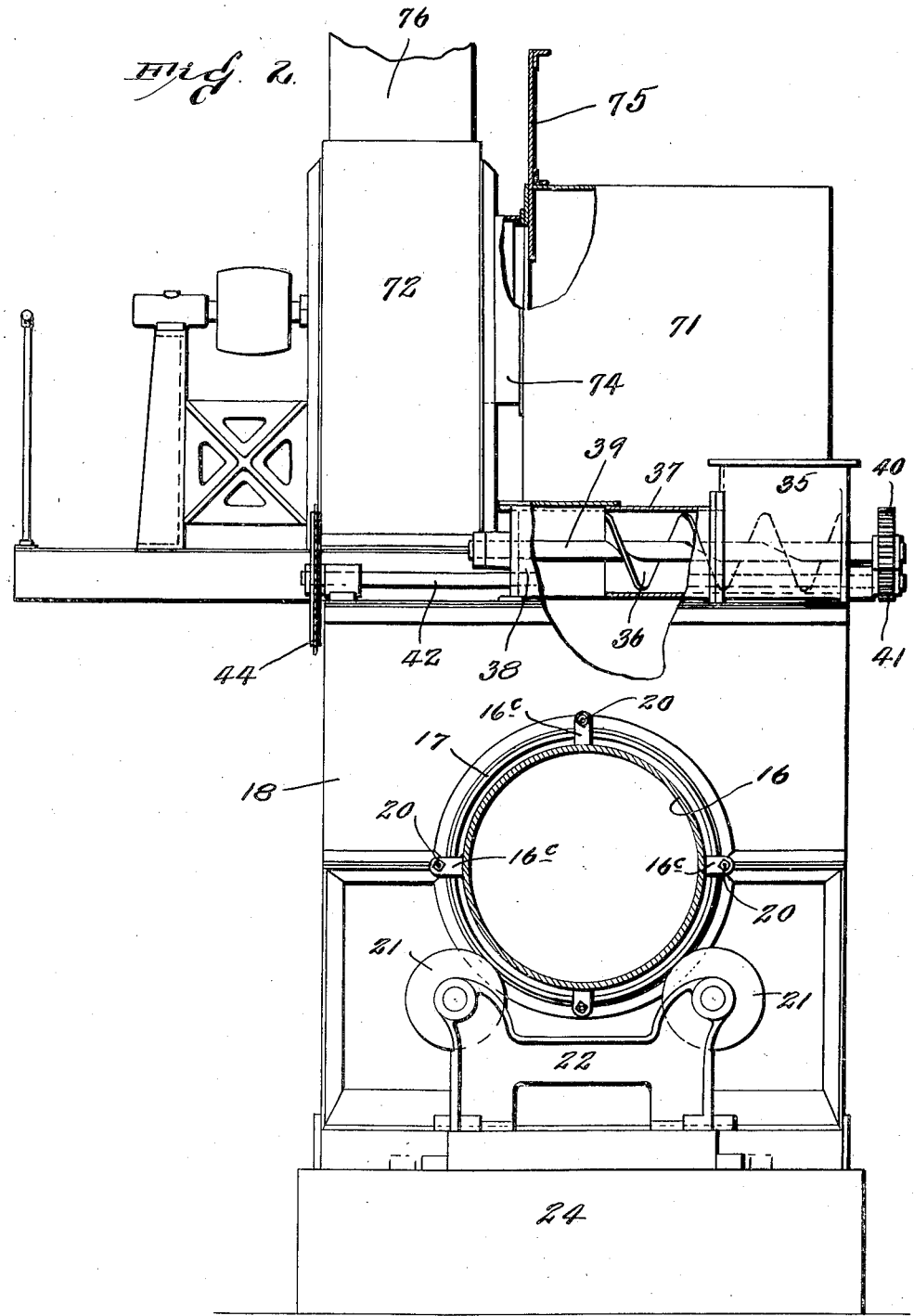

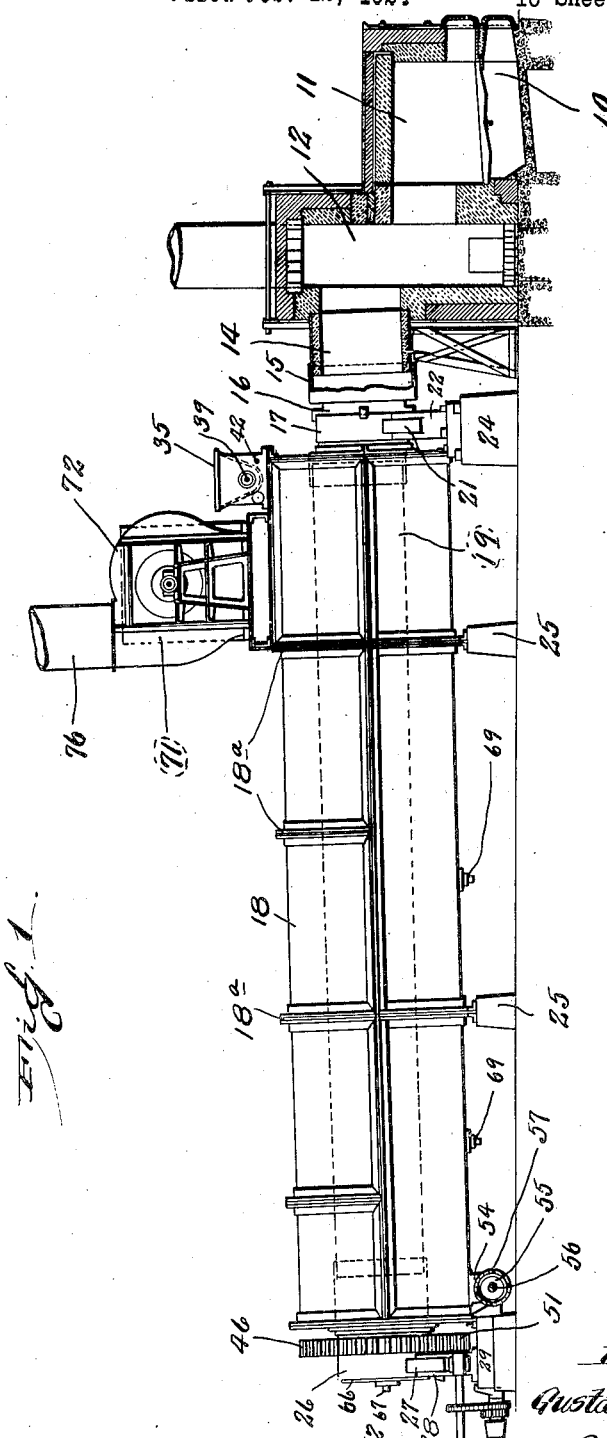

Sept. 6, 1927.
G. KOMAREK
1,641,337
DRIER
Filed Feb. 12, 1924     10 Sheets-Sheet 3
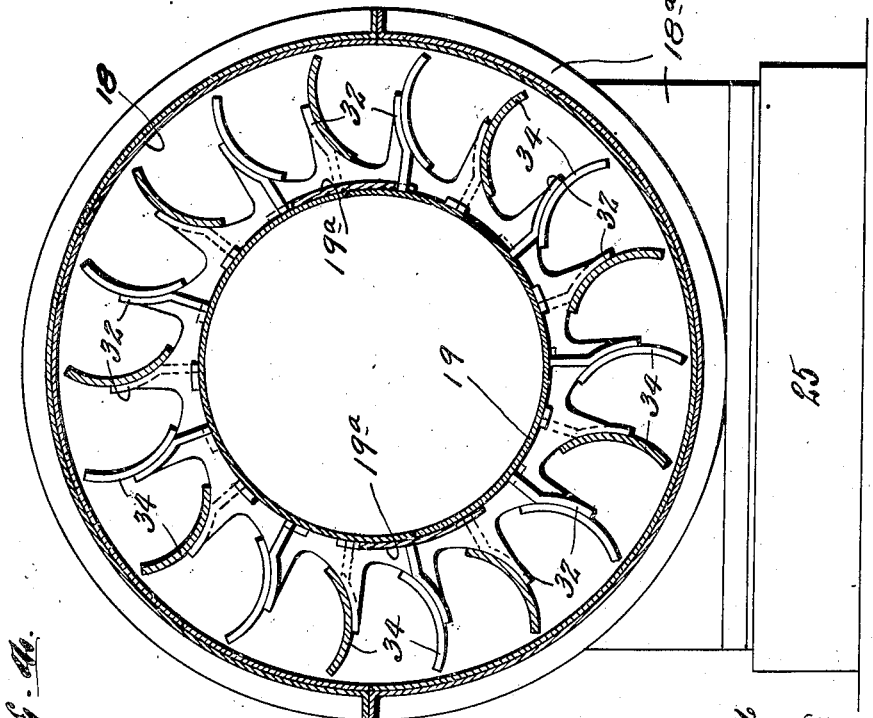
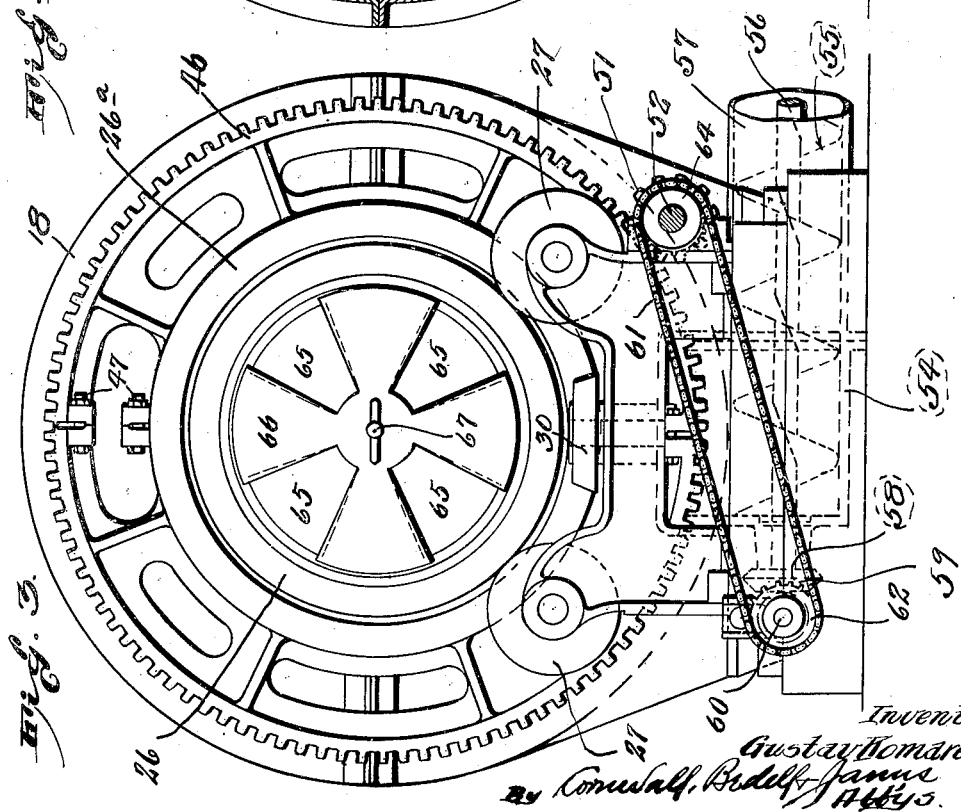
Inventor
Gustav Komarek

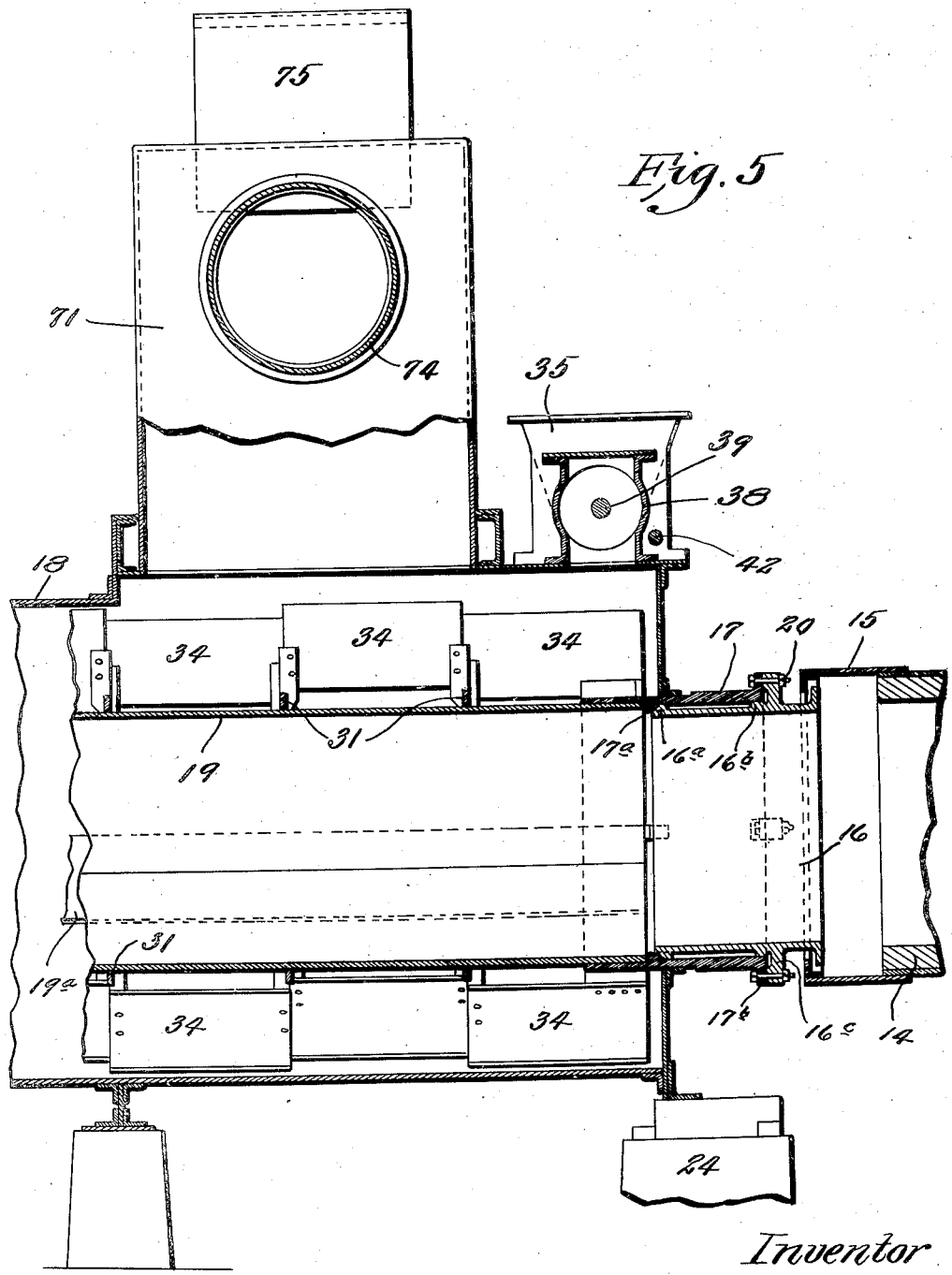

Sept. 6, 1927. 1,641,337
G. KOMAREK
DRIER
Filed Feb. 12, 1924 10 Sheets-Sheet 5
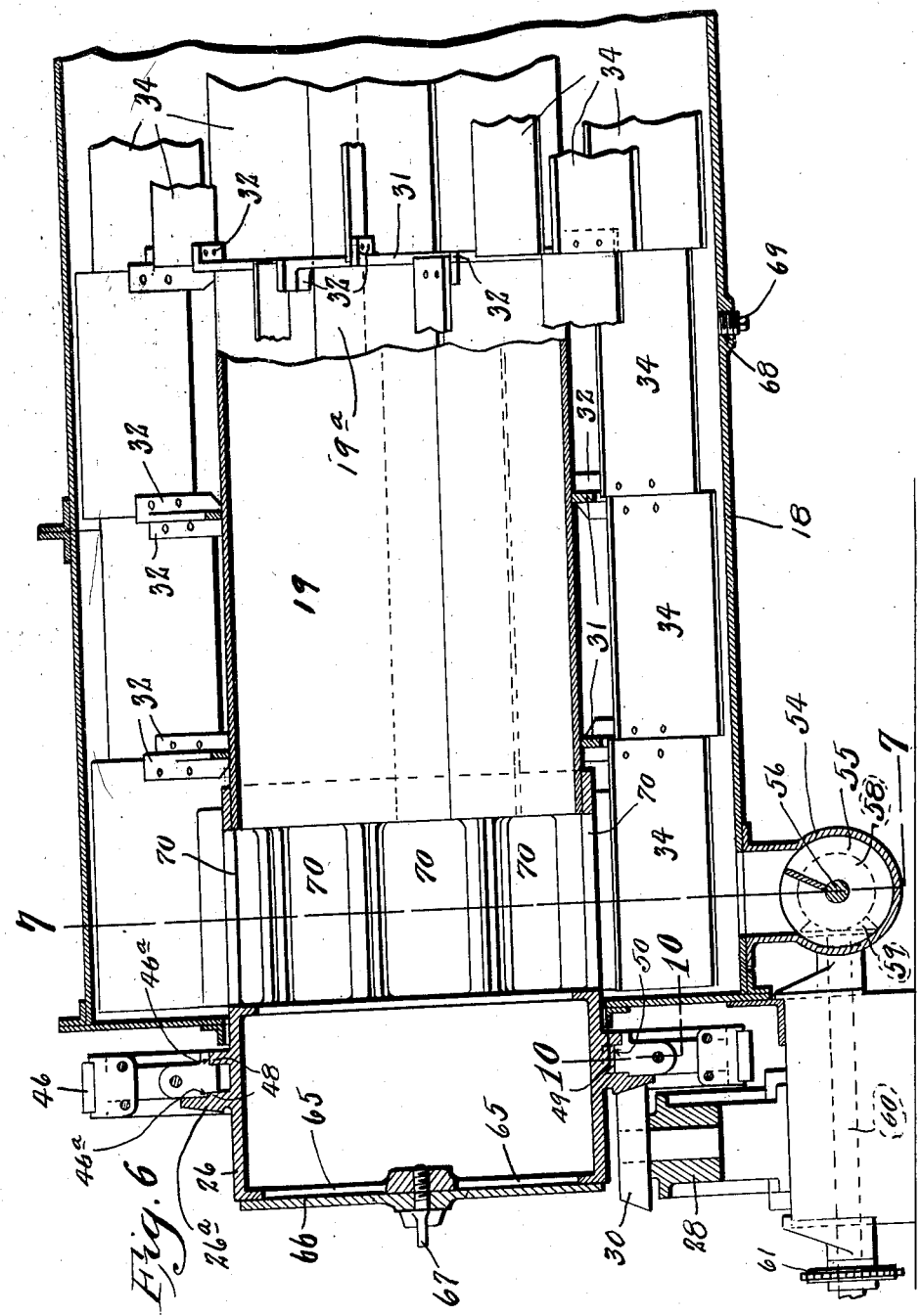
Inventor
Gustav Komarek
By Cornwall, Bidell-Janney Atty.

Sept. 6, 1927.  1,641,337
G. KOMAREK
DRIER
Filed Feb. 12, 1924  10 Sheets-Sheet 6
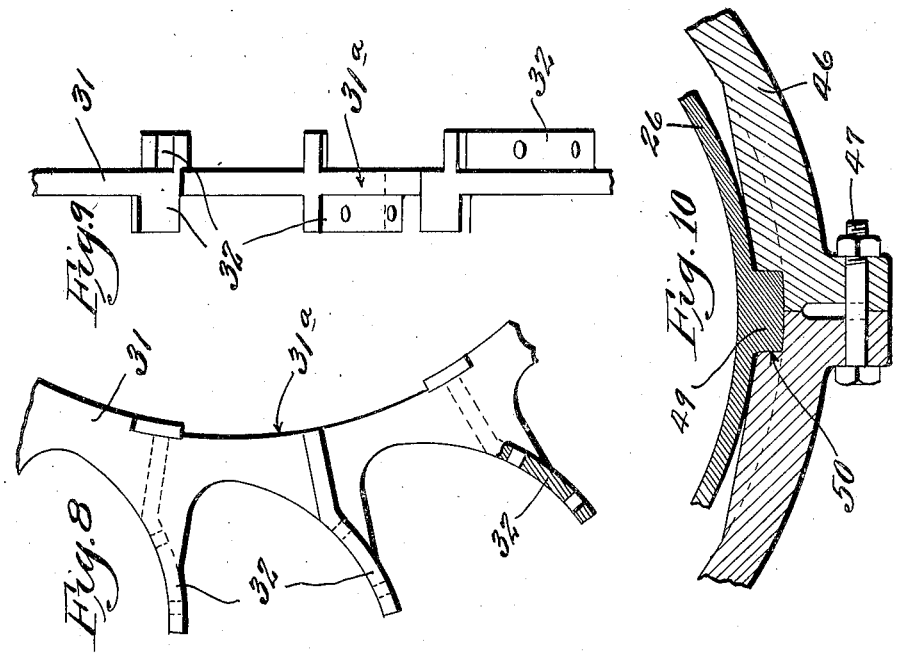
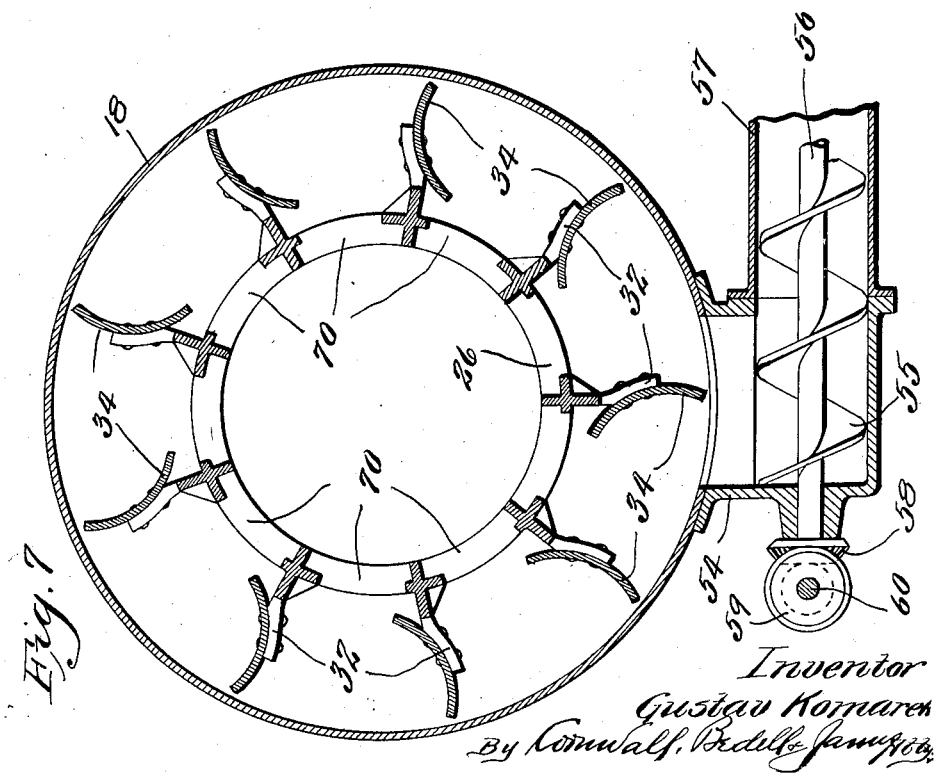
Inventor
Gustav Komarek
By Cornwall, Bedell & Jamison

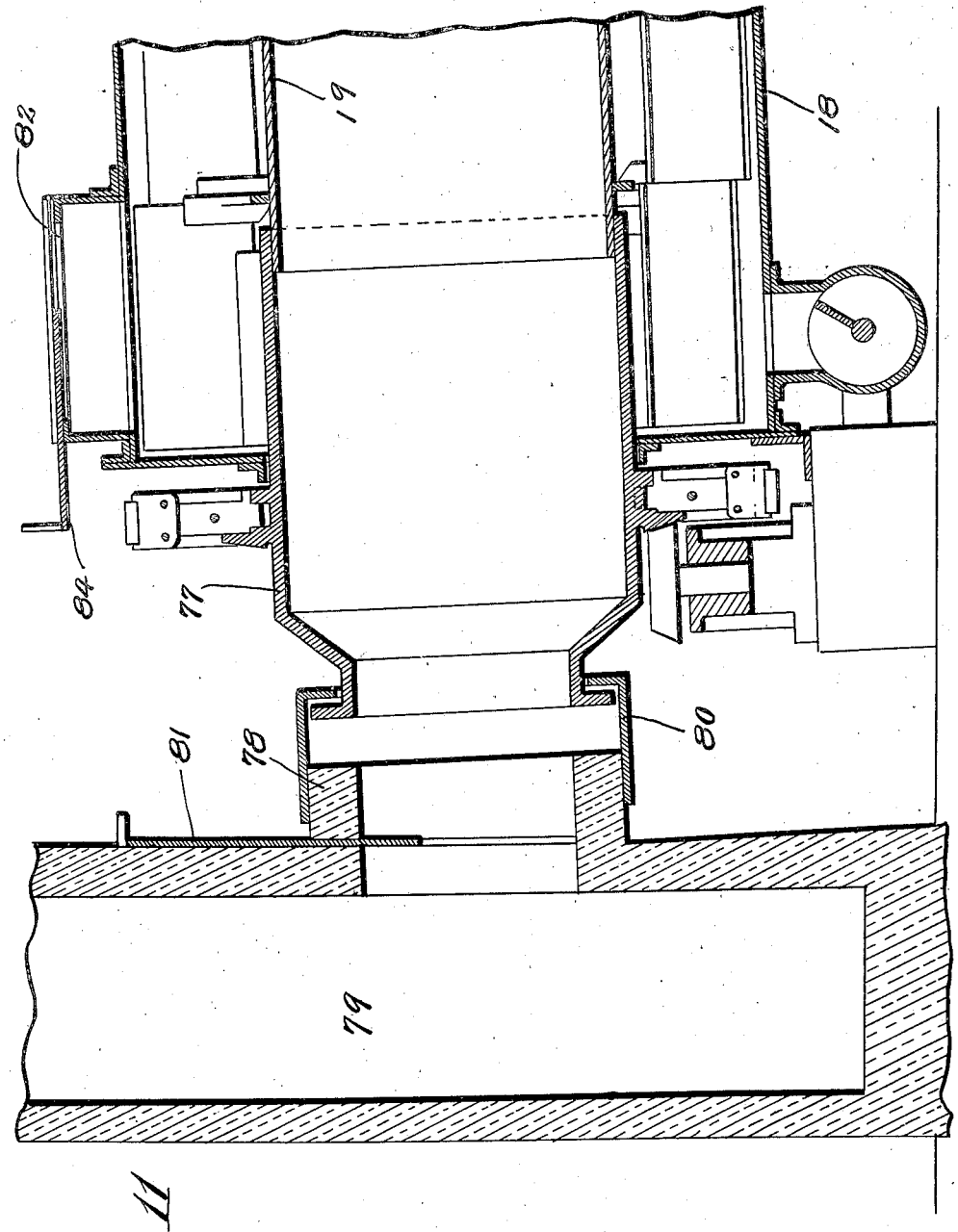

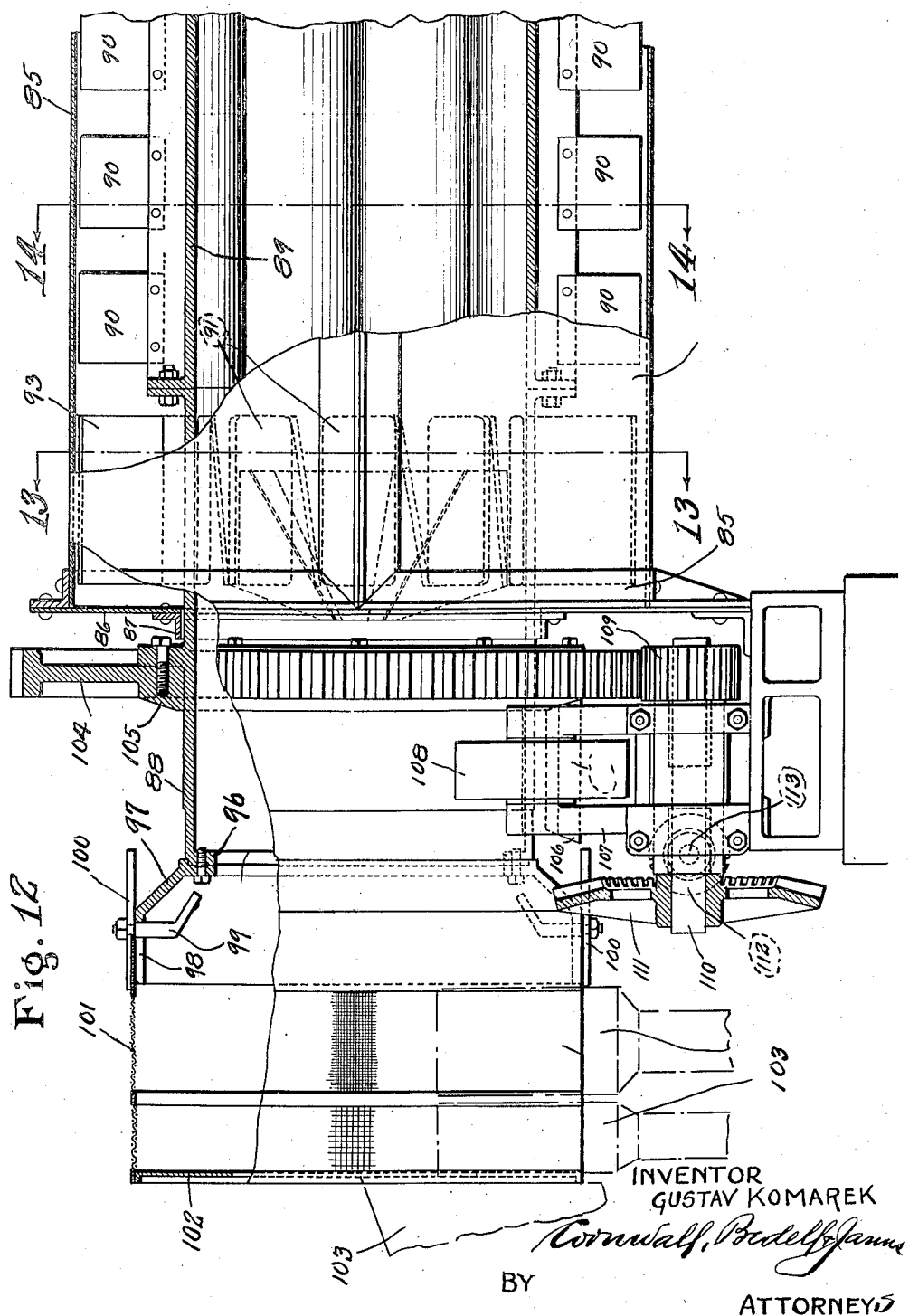

INVENTOR
GUSTAV KOMAREK
BY
ATTORNEYS

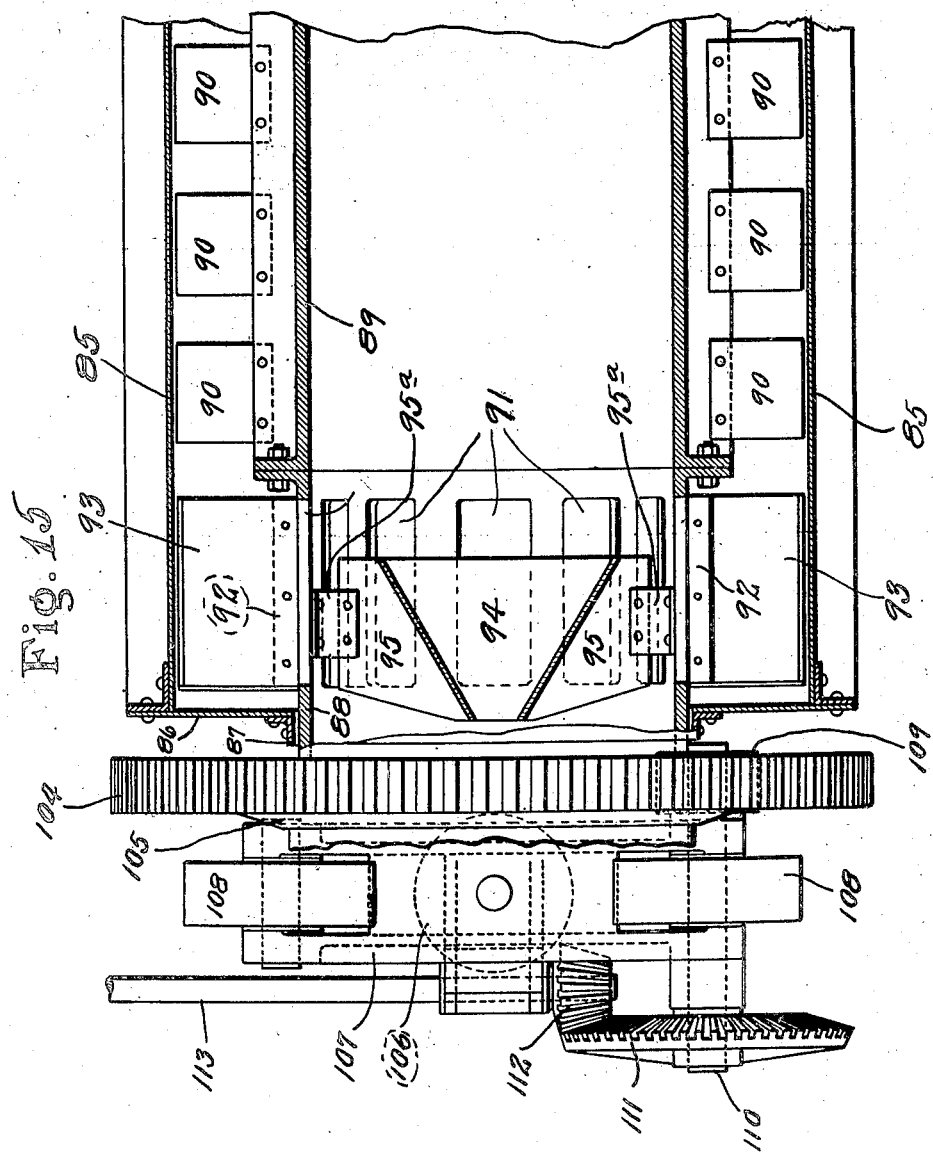

Patented Sept. 6, 1927.

1,641,337

UNITED STATES PATENT OFFICE.

GUSTAV KOMAREK, OF CHICAGO, ILLINOIS, ASSIGNOR TO MALCOLMSON ENGINEERING AND MACHINE CORPORATION, OF ST. LOUIS, MISSOURI, A CORPORATION OF MISSOURI.

DRIER.

Application filed February 12, 1924. Serial No. 692,209.

This invention relates to new and useful improvements in driers designed particularly for drying coal dust for briquetting purposes, food stuffs, and other granular or pulverulent material.

The objects of my invention are to provide a drier of the class described which is efficient in operation, is of strong and durable construction and has a large capacity; and to generally improve upon and simplify the construction of driers of this type.

Further objects of my invention are to provide a drier in which the material to be dried is contained in an annular space formed by a stationary shell or housing and a cylinder rotatably arranged in said housing and provided on its exterior with curved paddles or flights which operate in said annular space and by means of which the material contained therein is agitated and gradually fed toward the discharge end of the drier; and to provide simple and efficient means for mounting said paddles or flights on said rotatable cylinder.

Still further objects of my invention are to provide a mixing chamber in conjunction with the furnace and in which chamber the hot gases, or other heating medium, used in the drier is thoroughly mixed and tempered before entering the drier; and to provide suitable flue connections between the mixing chamber and the rotatable drying cylinder.

With these and other objects in view my invention consists in certain novel features of construction and arrangements of parts hereinafter more fully described and claimed, and illustrated in the accompanying drawings, in which—

Figure 1 is a side elevation of the drier with the furnace shown in section.

Figure 2 is a forward end view of the drier.

Figure 3 is a rear end view of the same.

Figure 4 is a cross-section taken transversely through the drier.

Figure 5 is a longitudinal cross-section through the forward end of the drier.

Figure 6 is a longitudinal cross-section from the rear end thereof.

Figure 7 is a transverse cross-section taken on line 7—7 of Figure 6.

Figure 8 is a fragmental view of one of the rings used for securing the paddles or flights in position on the rotatable cylinder.

Figure 9 is a fragmental elevational view looking against the inner face of said ring.

Figure 10 is a detail sectional view taken on line 10—10 of Figure 6.

Figure 11 is a longitudinal cross-section taken through the rear end of a modified form of my improved drier.

Figure 12 is a side elevational view partly in vertical section through the rear end of another modified form of my improved drier.

Figure 15 is a top plan view partly in horizontal section.

Figure 14:
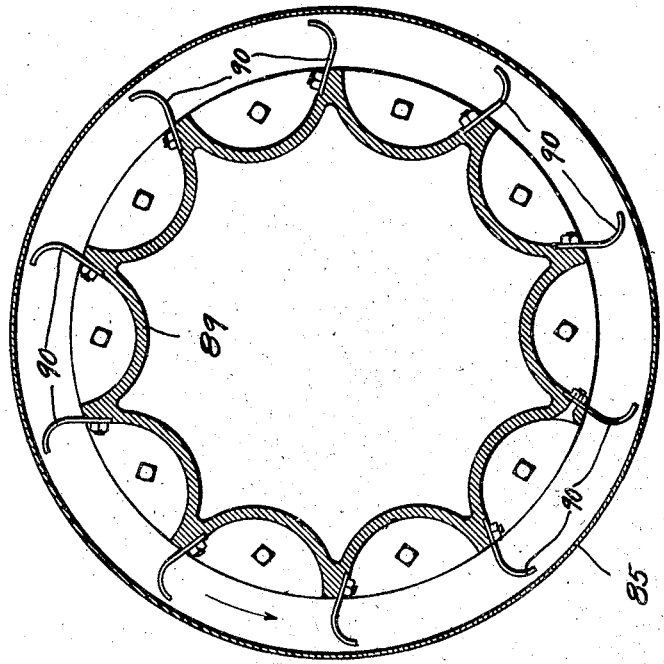
Figure 14 is a sectional view taken on the line 14—14 of Figure 12.
Figure 13:
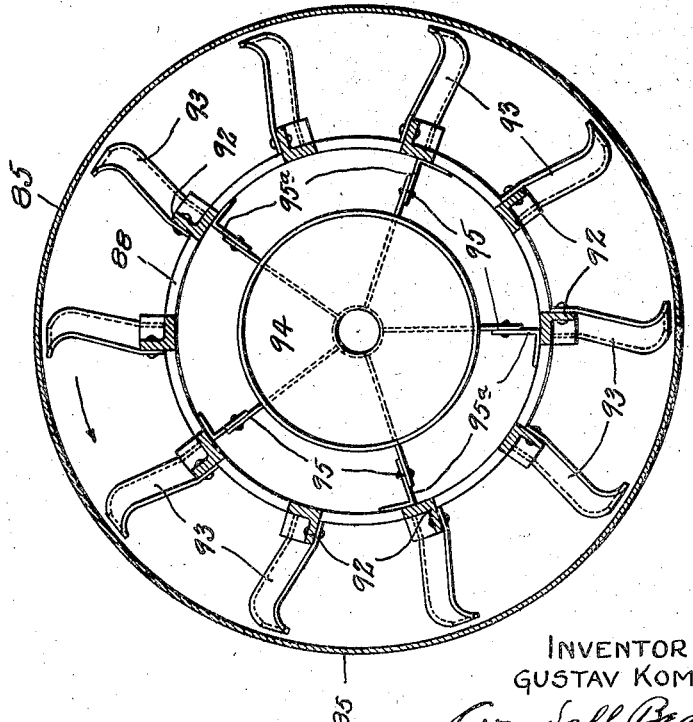
Figure 13 is a sectional view on line 13—13 of Figure 12.

The present application relates primarily to that class of driers in which the drying medium is conducted from the furnace through a hollow rotatable cylinder or drum centrally located in the stationary shell or casing, which latter is preferably of cylindrical shape. The rotatable cylinder drum is of smaller diameter than the outer stationary casing, and the annular space thus formed is designed to receive the material to be dried. In order to agitate this material and bring it in contact with the heated drum, the exterior of the rotatable drum is provided with a plurality of mixing plates or flights, which, when the drum is rotated, lift the material and cause it to cascade over the surface of the heated drum or cylinder. The drier is preferably placed at an angle, the feeding end of the drier being higher than the discharging end, thus causing the material contained in said drier to be gradually fed towards the discharging end of the drier during the operation of the drier.

The heating medium, which may be hot gases or hot air, after traversing the rotatable cylinder may be caused to enter the annular space between the rotatable cylinder and the stationary casing, and then be exhausted therefrom by any suitable exhausting means through a discharge opening formed in the forward end of the drier and arranged rearwardly of the feeding opening, as shown in the preferred form of construction in Figures 1 to 10.

This method is suitable in cases where the material to be dried is not affected injuriously by the hot gases or hot air as in drying coal dust for briquetting purposes. In drying foodstuffs or certain chemicals, it is not desirable to have the gases come in contact with the material being dried, and the heating medium in such cases is discharged directly from the rotatable cylinder into a stack, as disclosed in the modified form shown in Figure 11.

Referring by numerals to the accompanying drawings, 10 designates a furnace of any suitable construction having a combustion chamber 11 which communicates with a mixing or tempering chamber 12. The products of combustion or hot air, as the case may be, pass from the combustion chamber into the mixing chamber to be mixed and tempered before entering the drier. Leading from the mixing chamber is a cylindrical casing 14 having a lining of heat non-conducting material, and supported on said casing is a tubular member 15 provided on its outer end with an inwardly presented annular flange which encloses the outer end of a cylindrical casting 16. The other end of casting 16 is positioned within a track ring 17 and spaced therefrom by means of outwardly projecting lugs 16$^a$ and 16$^b$ which are formed integral with said casting and bear against the inner wall of ring 17. Lugs 16$^a$ are positioned on the extreme end of casting 16 and have inclined abutment walls which are designed to engage inclined walls of lugs 17$^a$ formed integral with track ring 17 and projecting inwardly therefrom. Track ring 17, which projects outwardly through a circular opening in the forward end wall of a stationary casing 18, is positioned in the forward end or a cylinder or drum 19, which latter is arranged in the stationary casing 18 and rotatably supported at its forward end by said track ring 17.

Ring casting 16 and track ring 17 are detachably held together by suitable fastening means 20 which are arranged in lugs or ears 17$^b$ and 16$^c$ of track ring 17 and casting 16, respectively.

Track ring 17 is rotatably supported in position by rollers 21 journaled in a casting 22. This casting and the forward end of stationary casing 18 rest on supports 24. Stationary casing 18 and cylinder 19 are axially aligned and slope rearwardly to the discharge end of the drier. The rear end of the cylinder 19 has secured to it the rear or inner end of a track ring 26, which latter projects outwardly from the stationary casing 18 and is rotatably supported on rollers 27. These rollers are journaled in a casting 28 mounted on a support 29, which latter also forms a support for the rear end of stationary casing 18. Banding angles 18$^a$ are arranged at suitable intervals on the exterior of casing 18 and are supported by supports 25.

Extending outwardly from the track ring 26 is a circular flange 26$^a$ having a beveled face for engagement with a beveled roller 30 which is vertically journaled in casting 28 and is designed to receive the end thrust of cylinder 19. Thus, the rotatable cylinder is held against longitudinal movement in one direction at its lower end by roller 30 while its forward end is left free to provide for expansion and contraction caused by the changes in temperature. Cylinder 19 is preferably made of two longitudinal sections, each of which is semi-circular in cross-section. These sections are joined together by splicing plates 19$^a$.

Rings 31 are arranged at spaced intervals on the exterior of cylinder 19 and projecting radially from each ring are a series of curved arms 32 to which are secured the ends of curved plates or flights 34. These plates when in position are longitudinally disposed in the annular space formed between the stationary casing and the rotatable cylinder, and, as the cylinder is rotated, lift the material to be dried and cause it to be cascaded over the heated surface of said cylinder, at the same time assisting in moving said material rearwardly in said stationary casing towards the discharge end thereof. Rings 31 are fixed in any suitable manner in position on cylinder 19 and each ring is provided with oppositely disposed notches or seats 31$^a$ for the accommodation of splicing plates 19$^a$.

The material to be dried is deposited in a hopper 35 located on top of the forward end of the stationary casing 18. The material is then fed by a spiral conveyor 36, one end of which operates in the lower end of said hopper through a pipe connection 37 to a casting 38 in the bottom of which is a discharge opening through which the material drops onto the rotatable cylinder 19. The conveyor is carried by a shaft 39 journaled in hopper 35 and casting 38 and one end of this shaft has a gear 40 meshing with a pinion 41 fixed to a shaft 42. This shaft 42 is journaled to one side of hopper 35 and casting 38 and is adapted to be driven in any suitable manner, such as by a sprocket wheel 44, and sprocket chain 45. The amount of material fed to the drier can be controlled by varying the speed of the driving means.

The actuating means for the rotatable cylinder 19 consists of a large gear 46 which is split and secured in position on the track ring 26 by fastening means 47. This gear is provided on each side with annular seats or shoulders 46$^a$ which are designed to engage and rest on annular shoulders or flanges 48 formed on track ring 26. In order to form a positive engagement between gear 46 and track ring 26, the latter is formed with a radially projecting lug or key 49 which is adapted to be seated in a notch or key seat 50 formed in the hub of gear 46.

Meshing with the gear 46 is a pinion 51 fixed to one end of a shaft 52 which is journaled in a bearing formed in casting 28 and is driven in any suitable manner.

The lower or discharge end of stationary casing 18 is provided in its bottom with a discharge opening and located below this opening and secured to the casing is a casting 54 having a chamber which communicates through said opening with the interior of casing 18. Operating in this chamber is a spiral conveyor 55 mounted on a shaft 56 which is suitably journaled in the casting 54. Conveyor 55 extends into a delivery pipe 57 which leads from casting 54 and by means of which the dried material is carried away from the drier. One end of shaft 56 has fixed thereon a bevel gear 58 which meshes with a bevel gear 59 carried by a shaft 60. This shaft is driven from shaft 52 by means of a sprocket chain 61 which operates over a sprocket wheel 62 arranged on shaft 60 and a sprocket wheel 64 fixed to shaft 52.

In the drying operation a certain amount of fresh air is preferably admitted to the annular space in which the material to be dried is contained for the purpose of assisting to carry out the moisture contained in said material. In the present form, the air is admitted through openings 65 formed in the outer end of track ring 26. The size of these openings can be regulated by means of a plate 66 which is mounted on said outer end of the track ring 26 and can be secured in its adjusted position by a butterfly nut 67. The bottom of the outer casing or shell 18 is provided at suitable locations with one or more openings 68 normally closed by plugs 69 screw-seated therein. By removing these plugs, a sample of the material in its various stages can be obtained through these openings and the condition of the material thereby ascertained.

In the construction illustrated in Figures 1 to 10, the products of combustion or hot air upon reaching the rear or discharge end of cylinder 19 pass through rectangular openings 70 formed in the inner end of track ring 26 into the annular space formed by said cylinder and the stationary shell and come in contact with the material contained therein. An expansion or exhaust chamber 71 is located above the forward end of casing 18 and is spaced rearwardly from said hopper 35. Leading from this chamber to an exhaust fan 72 is a pipe 74 and located in chamber 71 and controlling the communication between said chamber and said pipe is an adjustable damper 75. A discharge pipe 76 is connected to fan 72 and conveys the gases or air away from the drier. Chamber 71 has communication with the interior of stationary casing 18, the communication being arranged rearwardly of the opening through which the material is fed from hopper 35, so that when the gases or air are drawn from said casing 18 by the exhaust fan they do not come in contact with the fresh material fed into the drier from hopper 35.

Figure 11 shows a modified form of a drier particularly suitable for drying foodstuffs and other materials, such as chemicals, in which it is not desirable to bring the hot gases or air into contact with the material to be dried. In this form the heating medium instead of being returned to the forward feeding end of the drier through the annular space containing the material, the gases or air is discharged from the cylinder through a track ring 77 and a flue connection 78 into a stack 79. Track ring 77 is formed without peripheral openings so that there is no communication between the annular space containing the material to be dried and the interior of the rotatable cylinder, and the heating medium does not come in contact with said material. The space between the end of track ring 77 and the flue connection 78 is closed by a tubular member 80 which is carried by the flue connection 78 and encloses the flanged end of said track ring. A damper 81 is preferably located in flue connection 78 and can be adjusted in position so as to regulate the communication between the cylinder 19 and stack 79.

In order to admit fresh air to the annular space formed in casing 18, the rear end of said casing is provided with an extension having an inlet opening 82 formed therein. The size of this opening can be regulated by an adjustable closure means 84 slidably mounted in said extension.

The flue engaging end of track ring is preferably restricted in order to check the volume of gases passing therethrough, thus obtaining greater efficiency.

In the operation of the drier, the rotatable cylinder is heated by the passing therethrough of hot gases or air, and consequently, dries the material deposited in the stationary casing through hopper 35. The rotation of the cylinder causes the material to be repeatedly lifted by the curved plates or paddles and cascaded over the surface of the cylinder, the inclination of the drier causes the material to gradually work its way rearwardly through the drier and be discharged therefrom into the chamber 54 from which it is conveyed away by the conveyor 55. The exhaust fan 72 through its connection with exhaust or expansion chamber 71 exhausts the gases or air from the casing 18, so that fresh air or hot gases, or both, are drawn into the drying space and circulate therethrough. During its circulation through the annular drying space, the air is brought in contact with the material, absorbs and carries away through exhaust chamber 71 the moisture or vapors given off by said material, thus greatly increasing the efficiency of the drier.

In a modified form shown in Figures 12 to 15, the material after being dried, is discharged from the drier through a screen or screens, whereby the finer material is automatically separated from the coarser material. The means for supplying the material to be dried in the space between the stationary housing and rotatable cylinder and for drawing the heated air or gases forwardly through this drying space may be the same as that shown in the preferred form.

In the drawings, 85 indicates a stationary housing which is cylindrical in form at its rear end, said housing having its rear end partially closed by a plate 86, there being a central opening in said plate whose marginal edges are surrounded by a flanged member 87. 88 indicates a rear end ring casting projecting through this opening, said ring casting being preferably made of cast metal and providing a mount for cylinder 89, which cylinder is rotatably arranged in housing 85. As shown in Figure 14, this cylinder is provided with involute recesses on the crowns between which are bolted or otherwise secured short sections of lifting blades 90. These blades preferably have their outer ends curved forwardly, as shown, and when the inner cylinder is rotated in the direction of the arrow, as shown in Figure 14, the blades will lift and cascade the material to be dried, the involuted surface of the inner cylinder in addition to increasing the drying area thereof also providing pockets into which the material to be dried will be received, and thus caused to remain in longer contact with the heated cylinder than if said cylinder were not provided with involutions, as shown.

The inner end of the rear ring casting 88 is provided with a series of openings 91 between or on the marginal edge of which are radial ribs 92. These ribs are slightly spirally arranged or inclined relative to the axis of the rotatable cylinder 89 so as to provide a mount for inclined lifting blades 93 (see Figure 13) whose outer ends are curved forwardly as shown so as to lift the material in the rotation of the inner cylinder and discharge the same through the opening 91 into the interior of said cylinder. 94 indicates a cone mounted in the inner extension of the ring casting 88 (see Figures 12 and 15), which cone is provided with a series of flights 95 on its exterior, said flights being secured in position within the ring casting by means of bracket connections 95ª. Thus then the material is discharged through the opening 91, the major portion thereof will fall onto the cone 94 and be discharged at some point within the ring casting rearwardly beyond the openings 91. Any material which might not be caught by the cone would fall through the opening 91 located at that moment in the bottom of the rotatable ring, would be caught by the stationary housing and gradually worked down until it is again lifted and cascaded over the cone. The flights 95 form partition walls for preventing the material on top of cone 94 from rolling off in any direction except rearwardly.

The material discharged into the ring casting 88 behind the opening 91 will be gradually built up according to its angle of repose and finally pass rearwardly over an inwardly extending flange 96 at the rear end of ring 88. To this flange 96 is secured a flaring ring casting 97 having longitudinally disposed slots 98 in which are mounted angle bolts 99, said angle bolts passing through clamping plates or bars 100 arranged outside of the flared ring casting 97 for the purpose of holding a screen 101 in position. When desired a plurality of screens of varying mesh may be employed, the first screen being preferably of fine mesh, while the rearmost screen is of coarser mesh.

The end support 102 for the screens is preferably in the form of a plate having a central opening so that when the material is discharged into the flaring ring 97 it will be held there for some little time so that the finer particles will have an opportunity of passing through the screen of finer mesh and later on larger particles through the screen of coarser mesh, the tailings passing through the opening in ring 102. Suitable hoppers 103 may be employed for collecting the screened material and tailings whereby they may be spotted to appropriate bins.

The ring casting 88 is provided with a flanged extension to which is secured a toothed gear wheel 104, there being an inclined track face 105 formed on the hub of said gear for the purpose of cooperating with a tapered idle roller 106 (see Figure 12) mounted on a vertical shaft arranged in a casting 107. 108 are idle supporting rollers mounted on horizontally disposed shafts arranged in said casting 107 and which rollers 108 cooperate with the cylindrical track portion of the ring casting 88 (see Figure 12).

109 indicates a pinion mounted on a shaft 110 finding bearings in casting 107, said pinion 109 meshing with the gear 104 on the rotatable inner cylinder before mentioned. On the inner end of shaft 110 is a miter gear 111 meshing with a miter pinion 112 mounted on the end of a shaft 113 which is adapted to be driven in any suitable manner.

In operation the stationary housing or casing 85 and the rotatable inner cylinder 89, together with the ring casting 88, are preferably slightly inclined so that material will gradually work from the forward end to the rear end of the rotating cylinder. This material is dried by being lifted by the blades 90 and repeatedly cascaded over the cylinder 89 until it falls through the openings 91 when the cone 94 will divert the falling material and throw it rearwardly into the ring casting 88. Here the material will pile up until it falls into the flaring ring 97 and thence passes onward to the screen. Throughout the drying treatment of the material it is constantly kept in motion, first on the outside of the cylinder and then on the inside of the cylinder at the rear end thereof until it passes from the rear end of the cylinder.

What I claim is:

1. The combination of a source of heat, a rotatable drying cylinder, a tubular stationary housing enclosing said cylinder and spaced therefrom to provide an annular drying chamber, a heat tempering chamber communicating with said source of heat, and detachable tubular connections between said mixing chamber and one end of said rotatable cylinder for conducting the heating medium from said heat tempering chamber into said cylinder.

2. The combination of a source of heat, a stationary casing, a drying cylinder rotatably arranged in said casing, a cylindrical member secured to said cylinder and extending outwardly from said casing, said cylindrical member being provided with an annular flange at its extreme end, and a tubular member extending from said source of heat and having an inwardly presented flange at its extreme end which encloses and co-operates with the flanged end of the cylindrical member.

3. A drier comprising a stationary casing, a rotatable cylinder extending therethrough and spaced therefrom to provide an annular drying chamber, a plurality of flights arranged exteriorly on said cylinder operating in said annular chamber, said flights being curved forwardly in the direction of rotation of said cylinder, a furnace arranged at one end of said cylinder and a connection between said furnace and the adjoining end of said cylinder for conducting the heat from said furnace to the interior of said cylinder.

4. A drier comprising a stationary casing, a rotatable cylinder mounted therein, a furnace and a communicating means between said furnace and one end of said cylinder and detachably secured to the latter.

5. The combination of a furnace, a rotatable drying cylinder, a stationary cylinder portion extending from said furnace and in communication therewith, and a rotatable tubular connection detachably secured to said cylinder and in communicating engagement with said cylindrical portion for conducting the heat from said furnace to said cylinder.

6. The combination of a source of heat, a rotatable drying cylinder, a stationary cylindrical connection extending from said source of heat, a rotatable ring casting detachably secured to said cylinder, and a tubular member carried by said cylindrical extension and enclosing the free end of said ring casting.

7. The combination of a source of heat, a rotatable drying cylinder, a rotatable track ring detachably secured to said cylinder, and a stationary tubular connection extending from said source of heat and having communication with the outer end of said track ring.

8. The combination of a furnace, a stationary casing, a rotatable drying cylinder arranged in said casing, a track ring secured to said cylinder and projecting through said casing, a bearing support for said track ring, and a flue connection between said track ring and said furnace.

9. The combination of a furnace, a stationary casing, a rotatable drying cylinder arranged in said casing, a track ring secured to one end of said cylinder, a roller bearing therefor, a tubular member detachably secured to said track ring, and a tubular connection extending from said furnace and having one end engaging the other end of said tubular member and permitting expansion and contraction of said cylinder and parts associated therewith.

10. The combination of a stationary casing, a rotatable cylinder arranged therein, a track ring secured to each end of said cylinder, bearing rollers for supporting said track rings, a split driven member rigidly secured to one of said track rings, and driving means in engagement with said driven member for imparting rotary motion to said cylinder.

11. The combination of a stationary casing, a rotatable drying cylinder arranged therein, a track ring secured to each end of said cylinder, bearing rollers for supporting said track rings, a split driven member secured to one of said track rings and having interlocking engagement therewith, driving means in driving engagement with said driven member for actuating said cylinder and said track rings, and means for conducting the heating medium to said cylinder.

12. The combination of a stationary casing, a rotatable cylinder arranged therein and having its ends projecting therefrom, said cylinder being spaced from said casing to provide an annular drying chamber, a plurality of flights arranged exteriorly on said cylinder and operating by said chamber, a track ring secured to each end of said cylinder, bearing rollers for supporting said track rings, driving means engaging one of said track rings, for actuating said cylinder, and means engaging one of said track rings for receiving the end thrust of said cylinder in one direction and permitting the expansion of said cylinder in the opposite direction.

13. The combination of a stationary cylindrical casing, a rotatable drying cylinder arranged therein and spaced therefrom to provide an annular drying chamber, a feeding mechanism arranged above one end of said cylinder for conveying material to be dried into said annular chamber, there being an opening formed in the opposite end of said casing for discharging dry material therefrom.

14. The combination of a stationary cylindrical casing, a rotatable drying cylinder arranged therein and spaced therefrom to provide an annular chamber, a feeding mechanism arranged above one end of said casing for conveying material to be dried into said annular chamber, said casing being provided in its opposite end with a discharge opening, and conveying means arranged below said discharge opening for carrying away the dried material.

15. The combination of a stationary casing, a rotatable drying cylinder arranged therein, an exhaust chamber arranged above and in communication with one end of said stationary casing, said cylinder having openings formed in its opposite end to provide communication between the interior of said cylinder and said casing, a furnace, and means for conducting the products of combustion from said furnace to said cylinder.

16. The combination of a stationary casing, a rotatable drying cylinder arranged therein, an exhaust chamber arranged above and in communication with one end of said stationary casing, there being openings formed in the opposite end of said cylinder to form communication between said cylinder and said casing, an exhaust pipe leading from said exhaust chamber, and means for controlling the communication between said chamber and said exhaust pipe.

17. The combination of a stationary casing, a drying cylinder rotatably mounted therein, one end of said cylinder being adapted to receive suitable heating medium and the opposite end being provided with openings through which said heating medium passes from said cylinder into said casing, and exhausting means connected to said casing for drawing said heating medium through the annular space formed by said casing and said cylinder and discharge it from said casing at a point remote from its point of admission to said casing.

18. The combination of a stationary cylindrical casing, a drying cylinder rotatably arranged therein and spaced therefrom to provide an annular drying chamber, a plurality of flights arranged on said rotatable cylinder for moving the material through said annular chamber, a source of heat, means for admitting the heating medium from said source of heat to one end of said cylinder, means having connection with the opposite end of said cylinder for discharging the heating medium therefrom, a feeding mechanism for conveying the material to be dried into said annular chamber, means on said cylinder for engaging and agitating said material, and discharging means at the opposite end of said cylinder for removing the dried material.

19. The combination of a stationary housing, a cylinder mounted for rotation therein and having its ends projecting therefrom, an antifriction bearing for the rear end of the cylinder which projects through the rear end of said housing, and abutment means engaging the projecting end of said cylinder for preventing longitudinal displacement thereof in one direction only.

20. The combination of a stationary housing, a rotatable cylinder arranged therein, and adapted to be heated by a suitable heating medium, an exhaust chamber arranged at one end of said casing and communicating therewith for expelling air or gas from the annular space formed between said casing and said cylinder, and means at the opposite end of said casing for admitting fresh air thereto.

21. The combination of a stationary housing, a rotatable cylinder mounted therein, means for heating said cylinder, means arranged at the front end of said stationary housing for feeding the material to be dried into the annular space formed by said cylinder and said casing, adjustable means at the rear end of said housing for admitting fresh air into said annular space, and exhausting means for carrying away from said casing air and moisture at a point spaced rearwardly from the point of admission into said casing of the material to be dried.

22. The combination of a stationary cylindrical shell or housing, a rotatable cylinder mounted therein and spaced therefrom to provide an annular material receiving chamber, and a track ring at each end of said cylinder, said track rings protruding longitudinally through said housing and supported exteriorly thereof.

23. The combination of a stationary cylindrical housing, a rotatable cylinder mounted thereon and spaced therefrom to provide an annular material receiving chamber, track rings fixed to said cylinder and protruding from each end housing, bearing rollers for supporting said track rings and driving means attached to one of said track rings for the purpose of imparting rotary motion to said cylinder and said track rings.

24. The combination of a stationary shell or housing, a rotatable cylinder mounted therein, and an expansion chamber above one end of said cylinder.

25. The combination of a stationary shell or housing, a cylinder mounted for rotation therein, an expansion chamber formed by said shell at and above the forward end of the cylinder, and an exhaust pipe leading from said chamber.

26. The combination of a stationary shell or housing, a cylinder mounted for rotation therein, an expansion chamber formed by said shell at and above the forward end of the cylinder, an exhaust pipe leading from said chamber, and a fan connected to said exhaust pipe.

In testimony whereof I hereunto affix my signature this fourteenth day of January, 1924.

GUSTAV KOMAREK.